Mar. 6, 1923.
F. B. DUNN.
PROCESS OF MAKING BRICK.
FILED FEB. 16, 1922.
1,447,413.
2 SHEETS—SHEET 1.
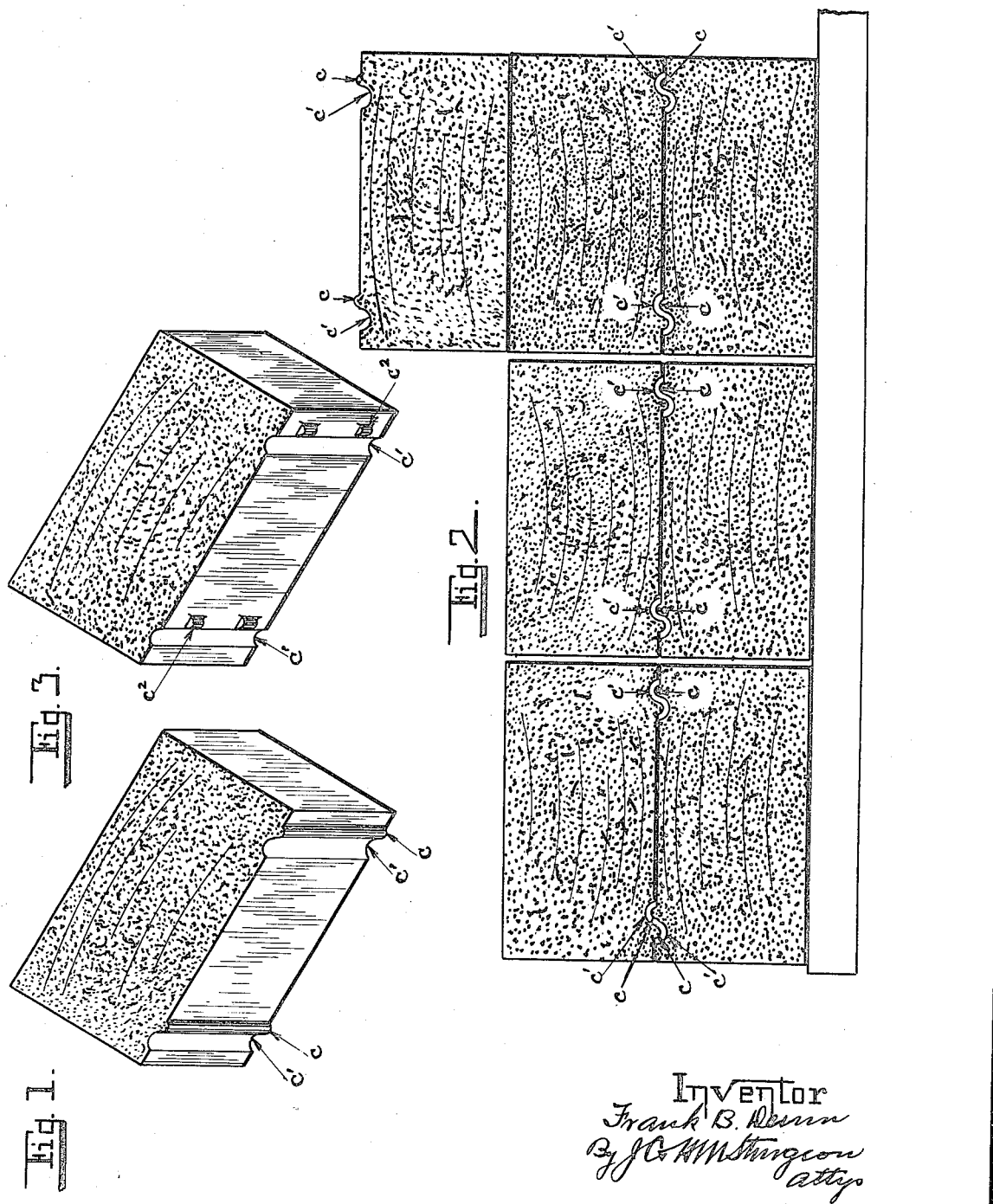

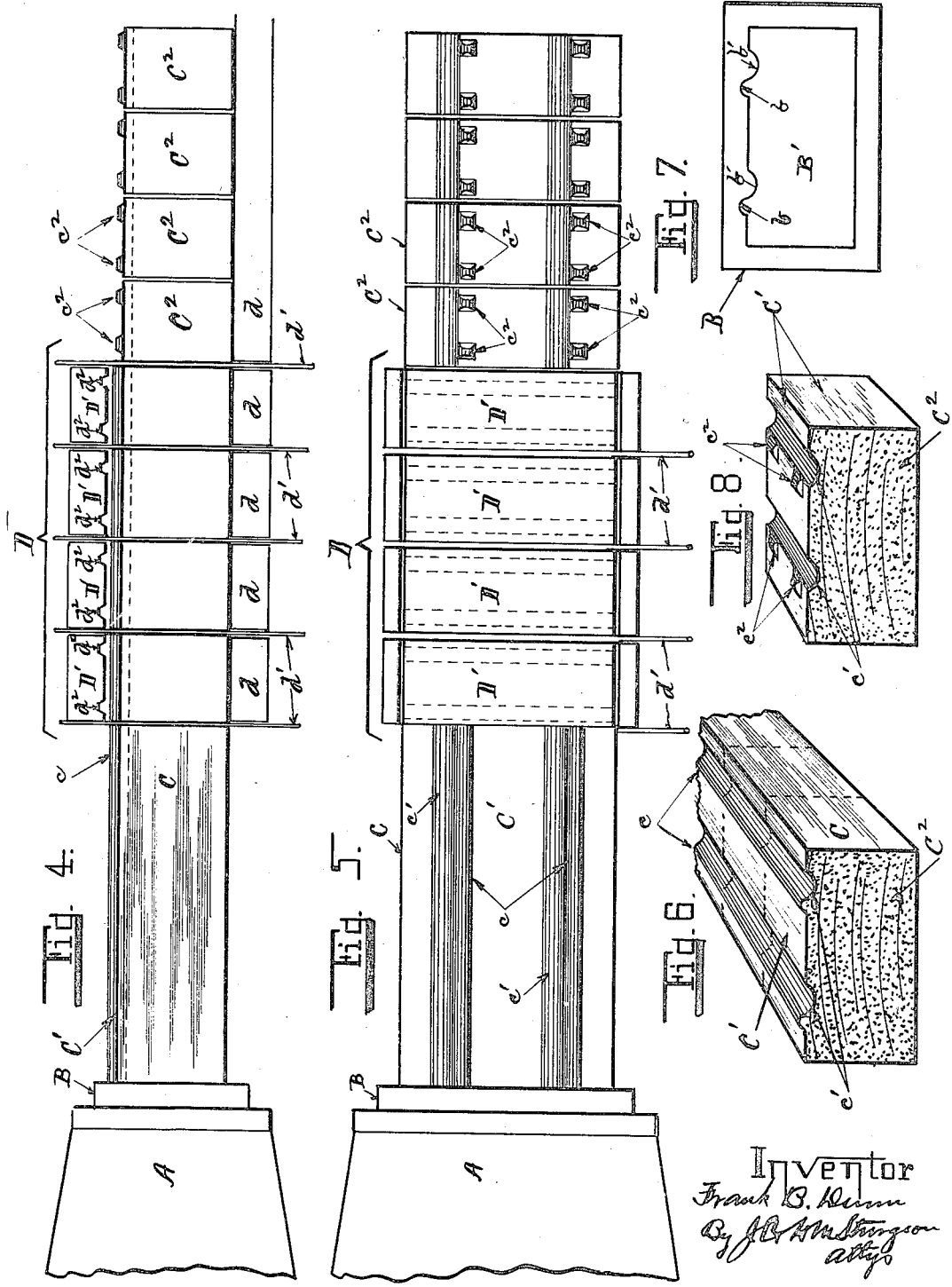

Patented Mar. 6, 1923.

1,447,413

UNITED STATES PATENT OFFICE.

FRANK B. DUNN, OF CONNEAUT, OHIO, ASSIGNOR TO THE DUNN WIRE-CUT LUG BRICK COMPANY, OF CONNEAUT, OHIO, A CORPORATION OF OHIO.

PROCESS OF MAKING BRICK.

Application filed February 16, 1922. Serial No. 537,108.

*To all whom it may concern:*

Be it known that I, FRANK B. DUNN, a citizen of the United States, residing at Conneaut, in the county of Ashtabula and State of Ohio, have invented certain new and useful Improvements in Processes of Making Brick; and I do hereby declare the following to be a full, clear, and exact description of the invention, such as will enable others skilled in the art to which it appertains to make and use the same, reference being had to the accompanying drawings and to the letters of reference marked thereon, forming part of this specification.

My invention relates to process of manufacturing paving brick, and particularly to that type of brick which are cut from a column of clay, and are popularly known in the brick industry as "wire-cut-lug brick."

The term wire-cut has been adopted by the brick industry to distinguish brick cut as a finished brick from the clay column as it comes from the auger machine, from brick which are repressed after cutting the same from the clay column to complete the finished brick, or from a moulded brick.

Therefore a "wire-cut" brick has four faces formed by the auger machine die, and two "wire-cut" surfaces formed by the wires of the cutter mechanism passing through the clay column.

In order to provide a suitable space between the brick when laid in a pavement, to receive cement or other suitable binding material between the bricks it has been found necessary to provide ribs or studs on the meeting surfaces of the brick to suitably space them apart when laid. This has heretofore been done either by cutting such ribs or studs by the operation of the cutting wires, by repressing the brick in suitable dies after they were cut, or by forming such ribs or studs on one of the die formed surfaces of the clay column, and then laying such brick in the pavement with one of the "wire-cut" surfaces up: this latter type of wire-cut brick being shown and described in my U. S. Patent No. 1,397,505, granted November 22, 1921.

In the stacking of such ribbed or studded brick in the kiln and burning them, great difficulty has been found because of the projecting ribs or studs interfering with and preventing the meeting of the adjacent surfaces of the bricks when stacked in the kiln; the result of which operation is that the ribs or studs have been either flattened down so as to render them ineffective, or to cause many of the brick to so bend or warp during the burning as to render them useless for paving, and a loss to the manufacturer. This difficulty my said patent overcomes; and I have devised a process for the manufacture of such wire-cut brick, consisting substantially of forming one surface of the clay column in the auger machine, with the ribs projecting above the surface, and grooves adjacent thereto below the surface of the clay column, so that the ribs and grooves will co-operate with each other when the bricks cut from this clay column are stacked with their ribbed faces placed together for drying and burning, the projecting ribs entering the depressed grooves and allowing the faces of the brick to rest in contact without in any manner crushing or interfering with the ribs or studs projecting therefrom.

Another feature of my process is a method of removing or depressing portions of the ribs so as to leave projecting spaced studs instead of continuous ribs on the die formed face of the brick as hereinafter described.

From the foregoing it will be seen that my invention consists in the process of producing a paving brick with practically uniform coacting sets of studs and grooves along one of its faces; the studs and grooves being so positioned with relation to each other that the studs of each set and the grooves of the opposing set respectively register each to each when a brick is reversely placed upon a similar brick, the object being to allow the grooves to receive the projecting ribs or studs when one brick is reversely placed upon another; thus allowing the flat surfaces of such adjoining bricks to contact when stacked for drying and burning during their manufacture; and thus preventing the crushing of the ribs or studs, or the bending or distorting of the bricks during the drying and burning thereof.

The features of my invention are hereinafter fully set forth and explained, and the accompanying drawings illustrate a convenient and preferred means for the practice of my said invention.

These drawings thus illustrating my invention show:

Figure 1, illustrates one of my improved brick.

Figure 2, illustrates the piling of these bricks in the kiln for burning.

Figure 3, illustrates a modified form of my improved brick.

Figure 4, shows a side elevation of a column of clay emerging from the die of an auger machine and a preferred form of mechanism for cutting the column into bricks.

Figure 5, shows a top or plan view of the same.

Figure 6, shows a perspective view of a portion of a clay column formed in accordance with my invention.

Figure 7, shows a front elevation of a die-plate for carrying out my invention.

Figure 8, shows a perspective view of a brick involving my invention.

In these drawings A indicates a portion of the auger machine of usual construction. B (Fig. 7) indicates a die-plate secured therein, having an opening B′ therethrough, the upper wall of said opening being provided with notches $b$ and ribs $b'$ for the purpose hereinafter set forth. C indicates a column of clay emerging from the opening B′ in the die-plate. $c$ indicates ribs on the upper surface of the column C formed thereon by the notches $b$ in the upper wall of the die-plate B; and $c'$ indicates grooves formed in the upper surface of the column of clay adjacent to the ribs $c$ by the projecting ribs $b'$ on the die-plate B. These ribs $c$ and grooves $c'$ extend longitudinally along the upper die-formed surface C′ of the column C.

After leaving the die-plate B the column C passes through the cutting machine D indicated diagrammatically in Figs. 4 and 5. The preferred form of cutting machine is shown and described in my U. S. Letters Patent No. 1,122,704 issued December 29, 1914, in which are shown the lower or supporting platen $d$ which supports the column of clay and is transversely slotted to permit the transverse travel of the cutting wires $d'$ by means of which the clay column C is cut up into individual bricks in the usual manner.

In the practice of my invention when ribs $c$ on the brick are desired, (see Fig. 1) the guide plates D′ are not necessarily used on the cutting machine, as the cutting of the bricks from the clay column may be done with ordinary cutting wires (see the bricks having wire-cut faces $C^2$) as illustrated in Fig. 6.

It will be observed that the die-plate B (Fig. 7) is provided with means $b$ for forming ribs, and means $b'$ for forming grooves $c'$ adjacent thereto on the upper surface of the clay column C, as clearly shown in Fig. 6, which ribs and grooves co-act with each other when the bricks cut from such clay column are stacked for drying and burning, as illustrated in Fig. 2, whereby any distortion of the ribs $c$ or warping of the brick is prevented.

If, however, it is desired to form studs $c^2$ on the brick, in place of the ribs $c$, as illustrated in Figs. 3 and 8, I then avail myself of the guide-plate mechanism D′ hereinbefore referred to. In that case the guide-plates D′ (see Figs. 4 and 5) are provided with longitudinal grooves $d^2$ in their under surfaces, said grooves $d^2$ being transverse of the ribs $c$ on the clay column C.

The pressure of the guide-plates D′ upon the ribs $c$ flatten said ribs between the grooves $d^2$ in the plates, the clay composing said ribs projecting upwardly into said grooves $d^2$ so that when the guide-plates D′ are raised up clear of the clay column at the termination of the transverse cutting movement of the wires $d'$, so that individual bricks $C^2$ pass out of the cutting machine D, having upon their upper surfaces projecting studs $c^2$, the ribs $c$ between the studs $c^2$ having been flattened down or eliminated, leaving spaced studs $c^2$ upon the upper wire-cut surfaces of the bricks.

It will be observed that the process of stacking the brick with the studs $c^2$ instead of the ribs $c$, is in all respects the same in its operation and effect as in the case of the brick with the ribs, hereinbefore directed, so further description thereof is unnecessary.

From the foregoing it will be readily seen that my improved process produces better and more desirable paving brick, with operatable and effective ribs or studs thereon, free from the defects of the prior manufacture, and results not only in an elimination of loss in such manufacture, but in the production of a better paving brick.

The mechanism shown and described herein is a preferred form for carrying out my improved process, it being obvious to those skilled in the art, that the same can be practiced by other forms of mechanism which can be designed to eliminate the clay forming the ribs $c$ between the points at which it is desired to locate the studs $c^2$, without departing from the scope of my invention.

Therefore I do not desire to limit myself to the exact form and construction of mechanism herein shown and described, but what I claim as new and desire to secure by Letters-Patent is:—

1. The steps in manufacturing a brick consisting substantially in forming projections and co-acting grooves on one face of a clay column, cutting the brick therefrom and stacking the same for drying and burning with their faces reversed so that each projection enters the co-acting groove in the brick upon which it is placed.

2. The steps in manufacturing a brick consisting substantially in forming projecting ribs and grooves co-acting therewith, removing portions of the ribs so as to leave portions thereof as projecting studs, cutting the bricks from the clay column and stacking such bricks upon each other for drying and burning with their studded and grooved faces so reversed upon each other that the studs thereon enter the co-acting grooves in the brick upon which it is placed.

3. The steps in manufacturing a brick consisting substantially in forming projecting studs and grooves co-acting therewith on one face of a clay column, cutting the bricks therefrom and stacking such bricks upon each other for drying and burning, with their faces so reversed that the studs enter the co-acting grooves in the brick upon which it is placed.

4. The steps in forming projecting studs on the die formed face of a wire-cut brick, consisting substantially in forming ribs and co-acting grooves in the auger machine die on one face of the clay column, and flattening intermediate portions of said ribs so as to leave portions of the same projecting from the face of the brick, and stacking such brick for drying and burning with their faces so reversed that the studs enter the co-acting grooves in the brick on which it rests.

5. The steps in forming projecting studs on one of the die-formed faces of a wire-cut brick, consisting substantially in forming ribs and co-acting grooves in the auger machine die on the face of the clay column, flattening intermediate parts of said ribs during the cutting of the clay column into bricks, and stacking such brick for drying and burning so reversed that the studs enter the co-acting grooves in the brick on which it rests.

In testimony whereof I affix my signature.

FRANK B. DUNN.